No. 619,432. Patented Feb. 14, 1899.
P. A. NOLAN.
HORSE DETACHER.
(Application filed Nov. 20, 1897.)
(No Model.) 2 Sheets—Sheet 1.
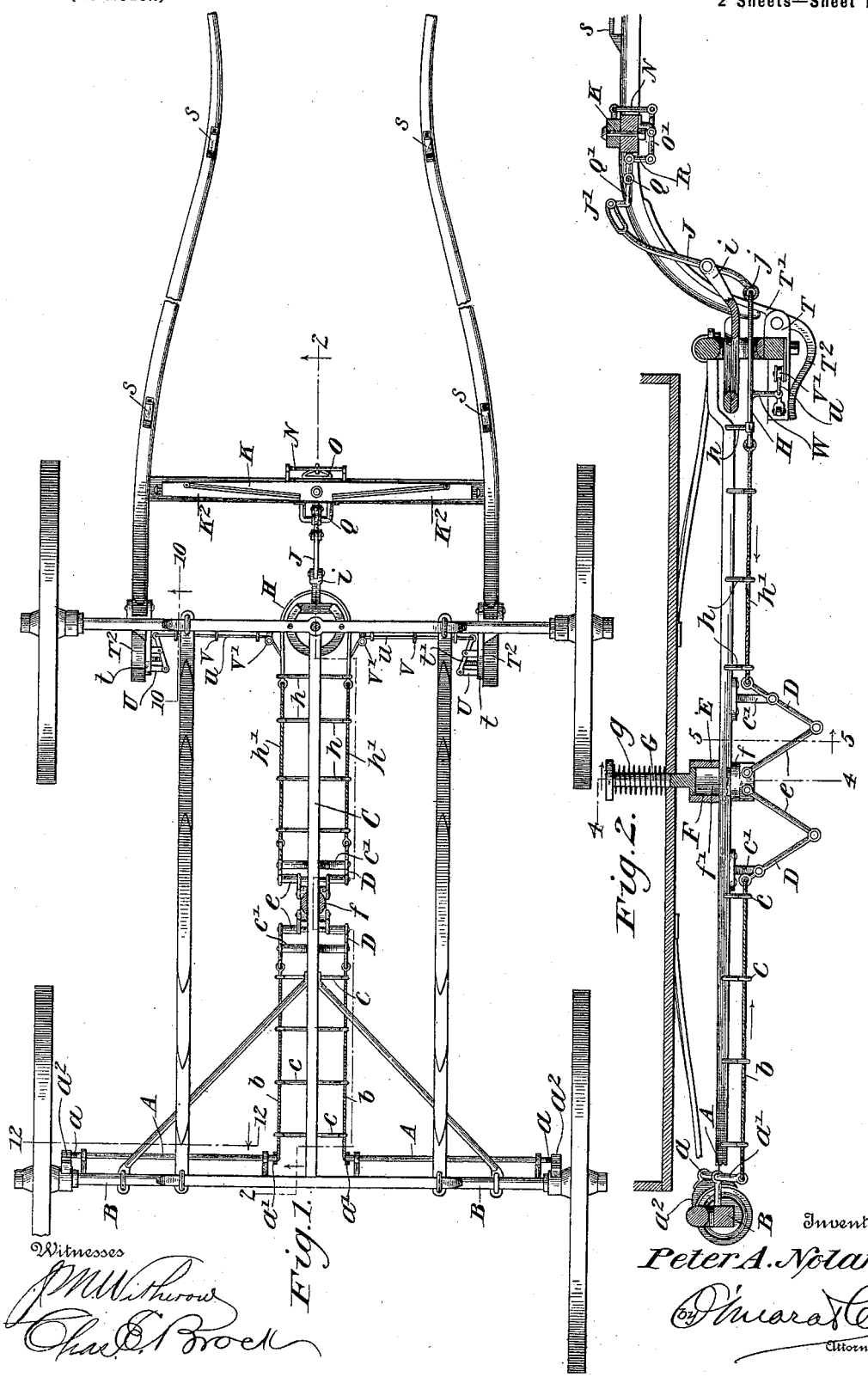
Witnesses
Inventor
Peter A. Nolan,
Attorneys No. 619,432. Patented Feb. 14, 1899.
P. A. NOLAN.
HORSE DETACHER.
(Application filed Nov. 20, 1897.)
(No Model.) 2 Sheets—Sheet 2.
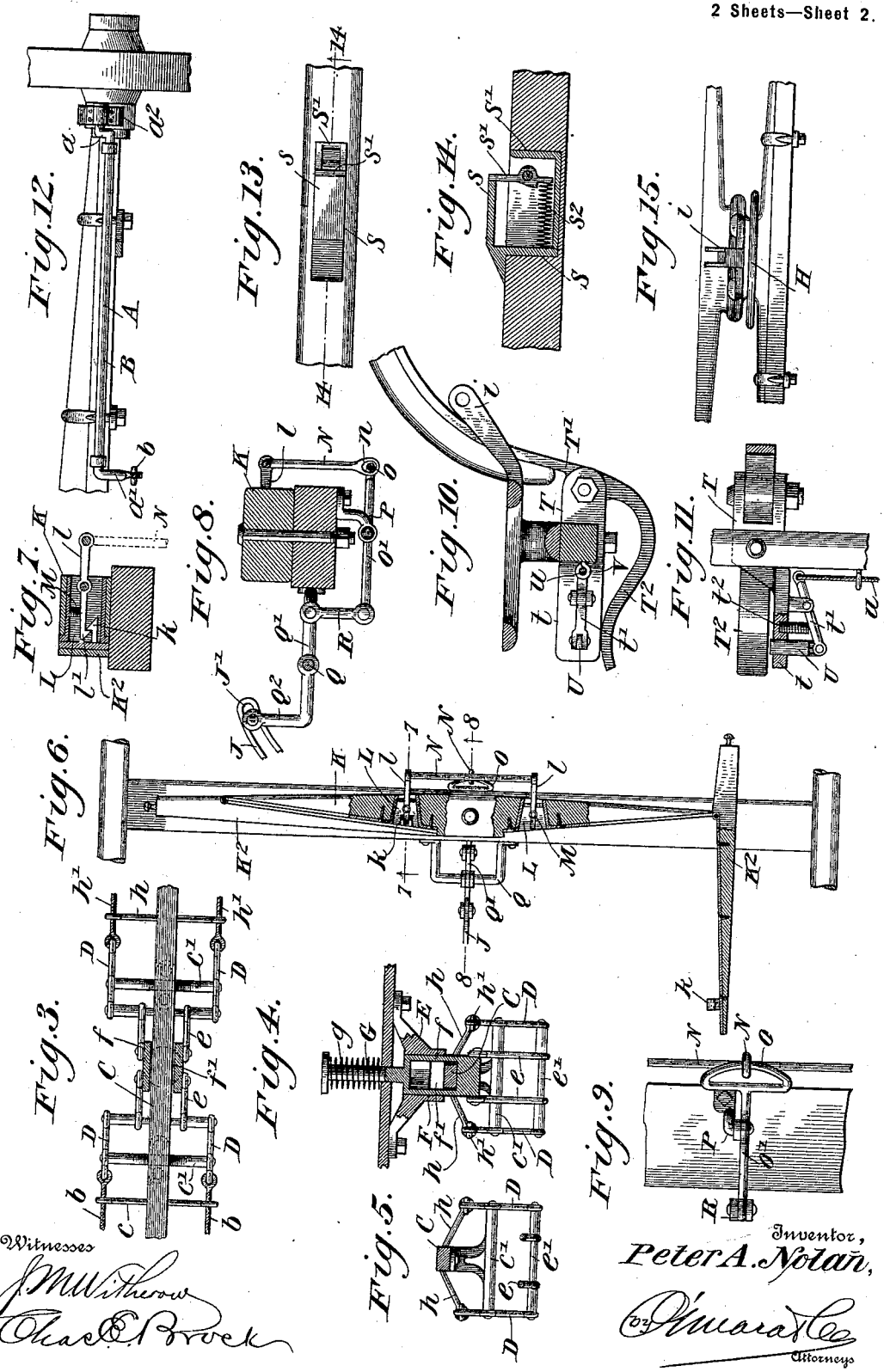
Witnesses
Inventor,
Peter A. Nolan,
Attorneys

UNITED STATES PATENT OFFICE.

PETER A. NOLAN, OF CHICAGO, ILLINOIS.

HORSE-DETACHER.

SPECIFICATION forming part of Letters Patent No. 619,432, dated February 14, 1899.

Application filed November 20, 1897. Serial No. 659,310. (No model.)

*To all whom it may concern:*

Be it known that I, PETER A. NOLAN, residing at Chicago, in the county of Cook and State of Illinois, have invented a new and useful Horse-Detacher, of which the following is a specification.

This invention relates generally to improvements in vehicles, and particularly to a device for detaching the horse therefrom in event of his becoming unmanageable.

The object of the invention is to provide a device which may be operated from the vehicle by the driver for instantly releasing the horse from the thills when he becomes unmanageable.

Another object is to provide a brake mechanism which will be operated simultaneously with the detacher for applying the brakes, so as to stop the vehicle.

A further object is to provide a device for supporting the thills when the horse has been detached therefrom, so that they will not engage the ground.

A still further object is to provide an improved construction of fastener to receive the straps of the harness and automatically release the same when the detacher has been operated, so that the horse may pass out of the thills.

With the above objects in view my invention consists of a brake mechanism, a push-rod for operating said mechanism, a singletree having pivoted sections which are normally locked to the main section, a mechanism for releasing said pivoted sections and permitting the same to swing forwardly, an operative connection between said mechanism and the push-rod, a device for supporting the thills, and an operative connection between said device and the push-rod, so that the horse is detached, the brakes applied, and the thills supported simultaneously.

The invention also consists of fasteners carried by the thills to receive the holdback-straps of the harness and adapted to automatically release the same when the horse is detached from the singletree.

The invention further consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a top plan view of the running-gear of a vehicle and the thills, showing my invention applied thereto. Fig. 2 is a vertical longitudinal sectional view on the line 2 2 of Fig. 1. Fig. 3 is an enlarged plan view of the push-rod and the adjacent mechanism. Fig. 4 is a vertical transverse sectional view on the line 4 4 of Fig. 2. Fig. 5 is a similar view on the line 5 5 of said figure. Fig. 6 is a top plan view of the singletree and a portion of the thills, one of the pivoted sections of said singletree being in position for releasing the trace. Fig. 7 is a vertical transverse sectional view on the line 7 7 of Fig. 6. Fig. 8 is a similar view on the line 8 8 of said figure. Fig. 9 is an enlarged view of a portion of the under side of the cross-bars of the thills, showing the construction of the intermediately-pivoted lever for operating the tripping-levers to release the pivoted sections of the singletree. Fig. 10 is a vertical transverse section on the line 10 10 of Fig. 1, the fifth-wheel being shown in section. Fig. 11 is a detail view of the mechanism for supporting the thills. Fig. 12 is a vertical sectional view on the line 12 12 of Fig. 1. Fig. 13 is a top plan view showing one of the improved fasteners for the straps of the harness. Fig. 14 is a vertical longitudinal sectional view thereof on the line 14 14 of Fig. 13. Fig. 15 is a front elevation showing the fifth-wheel.

Like letters of reference mark the same parts wherever they occur in the various figures of the drawings.

I will first describe the brake mechanism, the same consisting of the brake-rods A, extending parallel to the rear axle B of the vehicle and pivotally supported thereby, each of said brake-rods having oppositely-extending cranks $a\ a'$ on its respective ends, the cranks $a$ having the brake-shoes $a^2$, which are adapted to engage the hubs of the wheels, as clearly illustrated in Figs. 1 and 12. A cable $b$ is attached to the inner crank of each brake-rod, said cables extending parallel to the reach C of the vehicle, the same passing through eyes formed in the ends of the guide-rods $c$, which are secured to the under side of the reach. Brackets $c'$ depend from the under side of the reach adjacent the center thereof, and pivoted adjacent their upper ends to said brackets are the pairs of levers D, the rear pair of levers having the forward ends of the cables $b$ secured thereto. A bracket E, having a central bearing F, depends from the under side of the body of the vehicle at a point between the brackets $c'$, and having its enlarged lower end $f$ movable vertically in this bearing is a push-rod G, which extends upwardly through the bottom of the vehicle and is provided with a coiled spring $g$, which holds the same normally raised. The enlarged lower end $f$ of this push-rod is slotted vertically, as illustrated at $f'$, (see Fig. 4,) to receive the reach, which passes therethrough, and pivoted at their upper ends to the lower end of said rod are the pairs of links $e$, which at their lower ends are pivoted to horizontal rods $e'$, to which the lower ends of the pairs of levers D D are pivotally connected. It will be understood that as said push-rod is depressed the upper ends of the rear pair of levers D will be drawn forwardly, and through the medium of the cables the brake-shoes will be applied to the hubs of the rear wheels.

I will now describe the detaching mechanism for releasing the horse from the singletree.

A U-shaped rod H is positioned beneath the fifth-wheel of the vehicle, and has its legs extending through eyes formed in one of the guide-rods $h$, depending from the under side of the reach, and secured to eyes formed in the ends of said legs are the cables $h'$, which extend rearwardly through the guide-rods $h$ and are attached at their opposite ends to the upper ends of the respective levers D of the forward pair. The lower plate I of the fifth-wheel has the forwardly and upwardly extending arm $i$ formed thereon, to which the curved lever J is pivoted adjacent to its lower end, said lower end having the loop $j$, which embraces and moves upon the curved portion of the U-shaped rod. This rod is so formed to permit the movement thereon of said lever J as the fifth-wheel is turned.

The singletree is composed of the main section K, which is pivoted to the cross-bar K', as in the ordinary construction, said section having the pivoted sections K², pivoted adjacent their outer ends to the respective ends thereof, said pivoted sections carrying the inwardly-projecting hooks $k$ on their inner sides adjacent their inner ends, which are adapted to extend within recesses L formed in the section K of the singletree adjacent to and on opposite sides of its center. Said recesses extend entirely through section K of the singletree, as illustrated, and intermediately pivoted therein are the levers $l$, having their inner ends formed with the hooks $l'$, which engage the hooks $k$, carried by the pivoted sections, coiled springs M serving to hold the hooked ends of said levers in engagement with the hooks of the pivoted sections. The opposite ends of said levers extend forwardly and are attached to the respective ends of the T-rod N, which has an eye $n$, formed at the lower end of its stem, engaging and moving upon the curved bar of the elongated loop O, formed on the forward end of the lever O', which is intermediately pivoted to an arm P, depending from the under side of the cross-bar of the thills. Extending rearwardly from said cross-bar is a loop Q, upon which a lever Q' is intermediately pivoted, said lever having its rear end bent upwardly, as illustrated at Q², and carrying a pin which engages the upper slotted end J' of the curved lever J, the forward end of said lever Q' being pivotally connected to the rear end of lever O' by a link R. The operation of this part of my invention is as follows: When the push-rod is depressed, the upper ends of the forward pair of levers D are drawn rearwardly, which, through the medium of the cables and the curved rod, draw upon the lower end of lever J, moving the upper end forwardly and downwardly, causing the upward movement of the forward end of lever Q', and through the medium of the link R a downward movement of the forward end of lever O'. This downward movement of the forward end of lever O' draws upon the stem of the T-rod N, depressing the forward ends of levers $l$ and raising their hooked ends out of engagement with the hooks $k$ of the pivoted sections, permitting the same to swing forwardly, as is illustrated in one of said sections in Fig. 6. When these pivoted sections have been moved forward sufficiently far by the movement of the horse, the traces will slip therefrom and release the horse from the singletree.

In order to entirely release the horse from the thills, it is necessary to provide a fastener by means of which the holdback-straps may be attached to the thills and which will automatically release said straps. To this end I provide the vertical cavities S in said thills, in each of which I place the casing S', having a bar $s$ at its upper end, which is engaged by the upper end of the latch $s'$, which is intermediately pivoted in said casing. A coiled spring $s^2$ within the casing bears against the lower end of said latch and holds the upper end in engagement with the bar. The harness-straps are inserted upon the bar $s$ and are prevented from slipping therefrom by the latch $s'$. As soon as the traces are released from the singletree the strain is placed upon the straps which engage the latches $s'$ and press the same forwardly, thus slipping from the bars $s$ and releasing the horse from the thills.

I will now describe the mechanism for supporting the thills when the horse has been released therefrom, so that they are prevented from engaging the ground.

Secured to the under side of the axle at each end thereof is a bracket T, in which each thill-iron T' is pivoted, said thill-iron being provided with a downwardly and rearwardly curved extension T². The bracket is provided with a rearward extension t, which is slotted and to which a lever t' is intermediately pivoted, said lever being pivotally connected at its rear end to a block U, which is movable through the slot of the extension and adapted to be projected above the extension of the thill-iron to prevent the upward movement of the same, and consequently the downward movement of the forward end of the thills when the horse is released. Cables u are attached to the forward ends of levers t' and extend through guides V upon the inner side of the front axle and pass over pulleys V' adjacent the curved rod H, the inner ends of said cables being secured to arms W depending from the under side of the legs of said rod. Springs t² hold the blocks normally retracted.

When the push-rod is depressed and the curved rod moved rearwardly, the blocks U are projected above the extensions of the thills through the medium of the intermediately-pivoted levers t' and the cables u.

When the horse becomes unmanageable, the push-rod is depressed by the driver, the horse released from the singletree, the brakes applied, and the thills supported simultaneously.

From the above description it will be seen that I have produced a very simple device by means of which the horse may be instantly released from the vehicle, the speed of the vehicle checked by the brakes, and the thills prevented from dropping upon the ground.

While I have illustrated and described the best means now known to me for carrying out my invention, I do not wish to be understood as restricting myself to the exact details of construction shown and described, but hold that any slight changes or variations, such as might suggest themselves to the ordinary mechanic, will properly fall within the limit and scope of my invention.

Having thus fully described my invention, what I claim as new, and desire to secure by Letters Patent of the United States, is—

1. In a vehicle, the combination with the thills having an extension formed on one of the thill-irons below the pivotal point thereof, of a sliding block adapted to be projected above said extension, and means for actuating said block, substantially as set forth.

2. In a vehicle, the combination with the thills having an extension formed on one of the thill-irons below the pivotal point thereof, of an intermediately-pivoted lever, a sliding block pivoted to one end of said lever and adapted to be projected above said extension, a push-rod, and an operative connection between the push-rod and the opposite end of said lever, substantially as described.

3. In a vehicle, the combination of a singletree having pivoted sections adapted to receive the traces, a retaining mechanism adapted to hold said pivoted sections in a horizontal plane, a push-rod, an intermediately-pivoted lever, a link pivotally connecting one end of said lever with the push-rod, and an operative connection between the opposite end of said lever and the retaining mechanism, whereby when said push-rod is depressed the pivoted sections are released and permitted to swing forwardly, substantially as set forth.

4. The combination with a vehicle, of a lever intermediately pivoted to the fifth-wheel, a curved rod upon which the lower end of the lever is movable, cables secured to the free ends of said curved rod, intermediately-pivoted levers to which the inner ends of said cables are attached, a push-rod, links pivotally connecting the opposite end of said intermediately-pivoted levers with the push-rod, a singletree having pivoted sections which are adapted to receive the traces and carrying hooks, intermediately-pivoted levers having hooked ends to engage the hooks of the pivoted sections, and an operative connection between the opposite ends of said hooked levers and the upper end of the lever intermediately pivoted to the fifth-wheel, substantially as set forth.

5. In a vehicle, the combination of rods pivotally supported by the rear axle thereof and having oppositely-extending cranks formed on their respective ends, brake-shoes carried by the cranks at the outer ends thereof, cables attached to the cranks at the inner ends and extending forwardly through guides carried by the reach, a push-rod movable vertically upon the reach and extending through the floor of the vehicle, levers intermediately pivoted to the reach and having the inner ends of the cables secured to their upper ends, links pivotally connecting the lower ends of said levers with the push-rod, and a spring for holding the push-rod normally raised and the brake-shoes out of engagement with the wheels, substantially as set forth.

6. The combination with the thills, of a singletree having pivoted sections adapted to receive the traces and carrying hooks adjacent their inner ends, intermediately-pivoted levers carried by the main section of the singletree and having hooked ends normally engaging the hooks of the pivoted sections, a T-rod connecting the opposite ends of said intermediately-pivoted levers, a lever intermediately-pivoted beneath the cross-bar of the thills and having a loop which is engaged by the lower end of the stem of the T-rod, an intermediately-pivoted lever connected at its inner end with the opposite ends of the last-named lever by a link, a lever intermediately pivoted to the fifth-wheel and slotted at its upper end to receive a pin carried by the free end of said intermediately-pivoted lever, a curved rod upon which the lower end of the lever carried by the fifth-wheel moves, cables secured at one end to the legs of the rod and extending rearwardly through guides carried by the reach, intermediately-pivoted levers to which the ends of the cables are attached, a push-rod, and links pivotally connecting the push-rod with the last-named levers, substantially as set forth.

PETER A. NOLAN.

Witnesses:
J. W. MORTON,
ISAAC J. FRANKLIN.